United States Patent
Bravo

(10) Patent No.: US 11,920,829 B2
(45) Date of Patent: Mar. 5, 2024

(54) MICROWAVE AND ULTRAVIOLET ENERGY AIR STERILIZATION SYSTEM

(71) Applicant: Vincent Bravo, Haskell, NJ (US)

(72) Inventor: Vincent Bravo, Haskell, NJ (US)

( * ) Notice: Subject to any disclaimer, the term of this patent is extended or adjusted under 35 U.S.C. 154(b) by 88 days.

(21) Appl. No.: 17/239,584

(22) Filed: Apr. 24, 2021

(65) Prior Publication Data

US 2022/0341607 A1    Oct. 27, 2022

(51) Int. Cl.
| | |
|---|---|
| *F24F 8/22* | (2021.01) |
| *F24F 8/108* | (2021.01) |
| *F24F 13/06* | (2006.01) |
| *F24F 13/28* | (2006.01) |

(52) U.S. Cl.
CPC ............... *F24F 8/22* (2021.01); *F24F 8/108* (2021.01); *F24F 13/06* (2013.01); *F24F 13/28* (2013.01)

(58) Field of Classification Search
CPC .... F24F 8/22; F24F 8/108; F24F 13/06; F24F 13/28
See application file for complete search history.

(56) References Cited

U.S. PATENT DOCUMENTS

| | | | | |
|---|---|---|---|---|
| 4,900,344 | A * | 2/1990 | Lansing | F24F 8/158 55/482 |
| 5,616,172 | A * | 4/1997 | Tuckerman | F24F 8/80 96/57 |
| 6,322,614 | B1 * | 11/2001 | Tillmans | A61L 9/16 95/287 |
| 6,673,137 | B1 | 1/2004 | Wen | |
| 9,433,693 | B2 * | 9/2016 | Kirschman | A61L 9/20 |
| 2007/0137486 | A1 * | 6/2007 | Bergeron | B03C 3/155 96/66 |
| 2012/0183443 | A1 * | 7/2012 | Hurley | F24F 8/192 422/121 |
| 2014/0234163 | A1 * | 8/2014 | Faurie | A61L 9/20 422/4 |
| 2019/0063763 | A1 * | 2/2019 | Kleinberger | A61L 2/022 |
| 2022/0154953 | A1 * | 5/2022 | Herskovitz | F24F 8/22 |

FOREIGN PATENT DOCUMENTS

GB         2418335 A        3/2006

* cited by examiner

*Primary Examiner* — Justin M Jonaitis

(57) ABSTRACT

An air sterilization system utilizing three stages of sterilization using UVC and microwave energy created by one or more magnetrons powered by solid state high voltage supplies. The first stage is formed by a chamber with concentrated 265 nm UVC generated by two rings of UVC leds, the second stage formed by a chamber with a labyrinth to allow maximum exposure of the air by microwaves generated by 2 magnetrons, the third stage is formed with concentrated 265 nm UVC generated by two rings of UVC leds. There are also HEPA filters at both the inlet and outlet of the unit. The unit can be configured to be free standing without specialized installation required or can be hardwired into a circuit. Only the stand-alone unit incorporates a telescoping inlet to the height to be adjusted up to 12 feet.

16 Claims, 3 Drawing Sheets

MICROWAVE AND ULTRAVIOLET ENERGY AIR STERILIZATION SYSTEM

BACKGROUND OF THE INVENTION

The present invention relates in general to an air sterilization system incorporating microwave energy and a 265 nm UVC led source adapted for residential, commercial, and industrial applications. The present invention relates to the use of microwave energy created by multiple magnetrons within a sealed chamber to expose a column of air and any suspended particles within the air to the microwave energy.

Microwave energy is known for its sterilization properties as well as 265 nm UVC energy.

The present invention provides an air sterilization system using ultraviolet light and microwave energy generated from one or more magnetrons in a manner heretofore unknown, which is described in the following detailed description.

BRIEF SUMMARY OF THE INVENTION

The present invention is generally directed to a microwave energy air sterilization system also using a HEPA filter as a first stage and a 265 nm UVC source as a second stage sterilization and a third stage HEPA filter as a final stage. For example, the system can be configured to provide sterilized air for commercial, medical, industrial and residential spaces.

In accordance with one embodiment of the present invention, there is disclosed a microwave energy sterilization system comprising: a housing forming an internal chamber comprised of steel as a microwave shield in communication with an inlet and an outlet: an air delay unit comprised of alternating passages within the chamber for maximum exposure of air to microwaves the delay unit is construct of RF transparent material. The magnetrons are powered by solid state power supplies to minimize heat and increase efficiency.

In accordance with a further embodiment of the present invention there is disclosed two secondary sterilization stages comprising; a housing forming a UVC exposure chamber. The UVC exposure chamber is mounted one to the outlet and one to the inlet. The inlet and outlet incorporate 99.5% HEPA fitters.

The outer enclosure provides access to all components through a removable side panel providing access to the magnetrons and all other components through the side of the enclosure.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof may best be understood by reference to the following detailed description when read with the accompanying drawings in which:

DETAILED DESCRIPTION OF THE PREFERRED EMBODIMENTS

Figure 1:
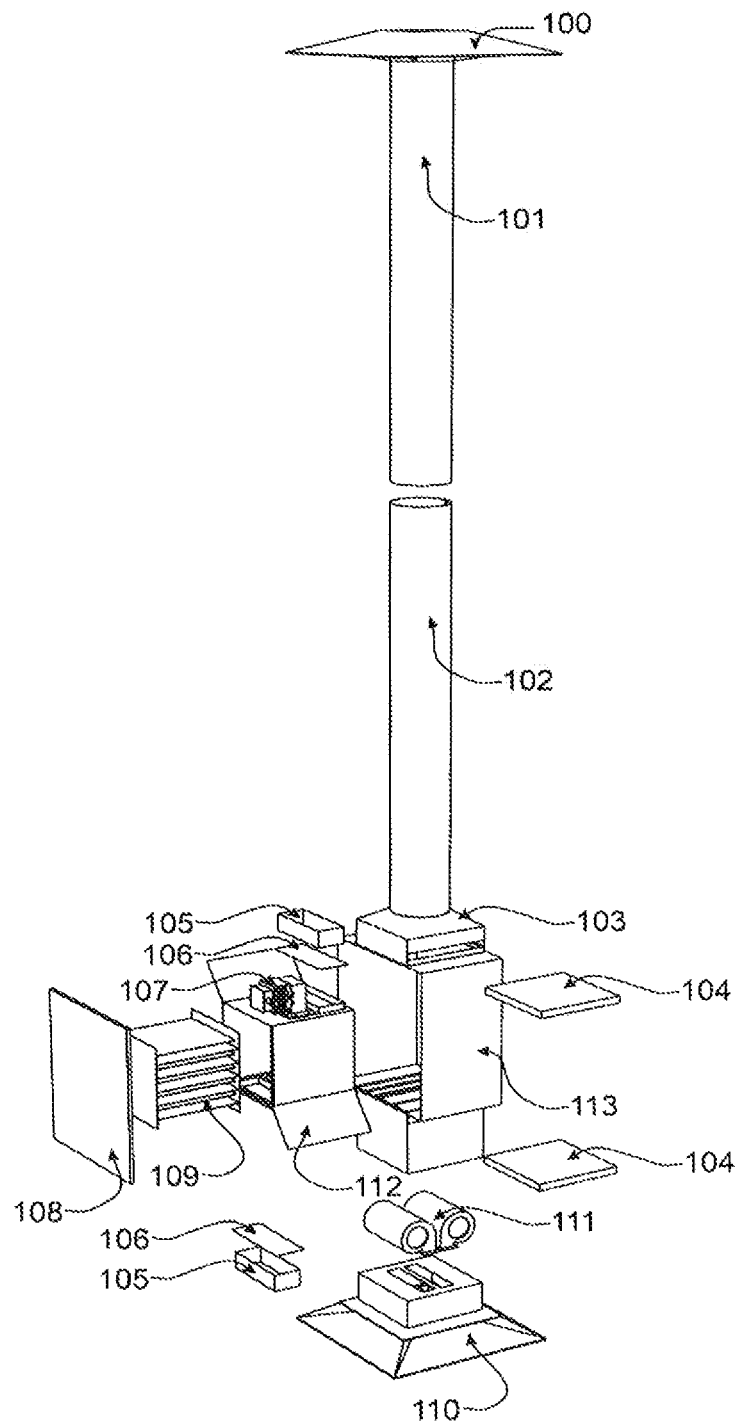
FIG. 1 is a perspective exploded view of an air sterilizer system in accordance with one embodiment of the present invention, as illustrated within a housing or cabinet.

In describing the preferred embodiments of the invention illustrated in the drawings, specific terminology will be used for the sake of clarity. However, the invention is not intended to be limited to the specific terms so used, and it is to be understood that each specific term includes all equivalences that operate in a similar manner to accomplish a similar purpose.

Figure 2:
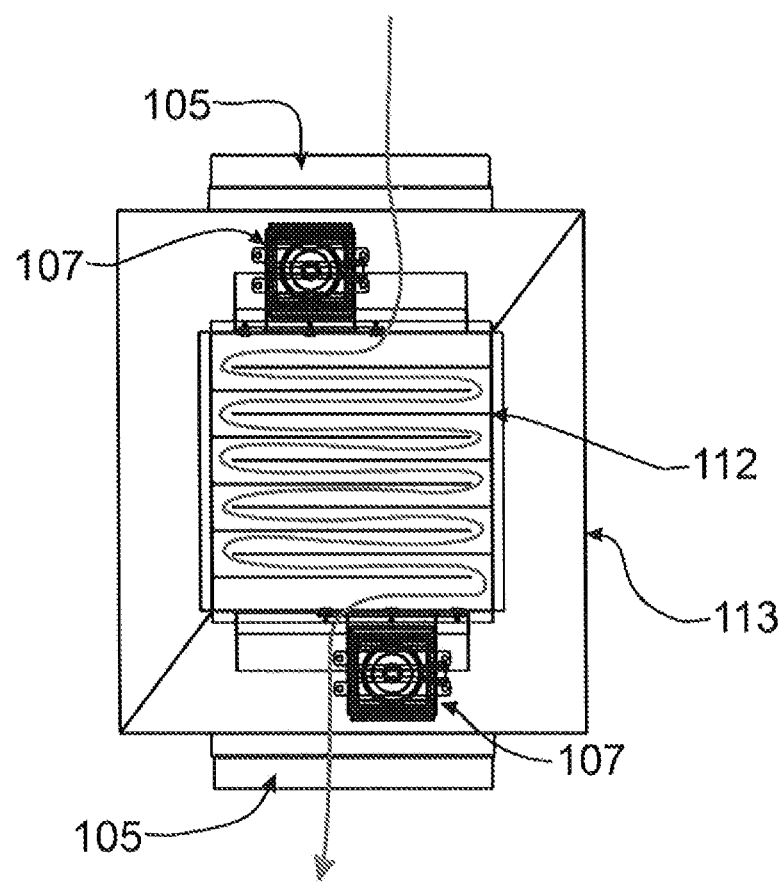
FIG. 2. is a cross-section view of the delay chamber air path within. In accordance with one embodiment of the present invention.
Figure 3:
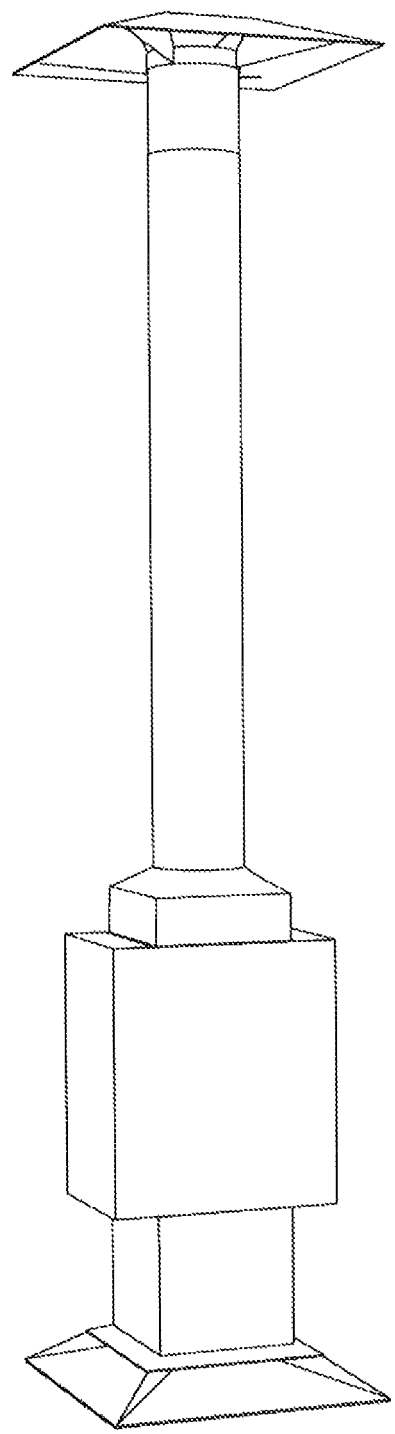
FIG. 3 is a perspective assembled view of the air sterilizer in accordance with one embodiment of the present invention.

Referring to FIGS. 1 and 2, wherein like reference numerals represent like elements, there is shown a microwave and ultraviolet energy air sterilization system in accordance with the embodiments of the present invention. The microwave and ultraviolet energy air sterilization system includes a collector 100, where air is drawn through the collector 100 at the top of the telescopic tube 101 and 102 then directed to the HEPA filter 104 at the top of the main enclosure 103.

The microwave and ultraviolet energy air sterilization system also includes a housing 113 or cabinet constructed to contain the operative components, assemblies, sub-assemblies, systems, and subsystems to be described hereinafter. The housing is constructed to include air inlet and discharge air outlet. The inlet air is directed through a port 105 containing a 265 nm UVC led source delay chamber 109 that directs air through folded passages. This delays the air to assure maximum exposure of the air and any suspended particles to the microwaves. The delay chamber 109 is constructed of RF transparent material. This chamber which forms the second stage is housed within a steel housing 112 with inlet and outlet ports covered with a microwave shielding screen 106.

The microwave and ultraviolet energy air sterilization system's chamber has two magnetrons 107, two on opposing sides and staggered horizontally to assure overlapping microwave coverage within the chamber. Air is discharged through a port 105 containing a 265 nm UVC led source. The side of the cabinet is scaled by the side cover 108. The lower section forms the stand 110 and contains the blowers 111 and directs the air to the floor.

Although the invention herein has been described with reference to particular embodiments, it is to be understood that these embodiments are merely illustrative of the principles and application of the present invention. It is therefore to be understood that numerous modifications may be made to the illustrative embodiments and that other arrangements may be devised without departing from the spirit and scope of the present invention as defined by the appended claims.

What is claimed is:

1. A system for processing air for the removal of pathogens, the system comprising:
   a housing having an air inlet for receiving contaminated air to be processed and a discharge air outlet for discharging processed air;
   a delay chamber having an inlet and an outlet, the delay chamber comprising RF transparent material forming a labyrinth of alternating passages, the delay chamber arranged within the housing between the air inlet and discharge air outlet;
   a first magnetron adjacent the inlet of the delay chamber and a second magnetron adjacent the outlet of the delay chamber, the first and second magnetrons generating microwave radiation directed into the labyrinth of the delay chamber;
   a first UVC energy source adjacent the inlet of the delay chamber for exposing contaminated air to UVC energy before passing through the delay chamber; and a second UVC energy source adjacent the outlet of the delay chamber for exposing air exiting from the delay chamber to UVC energy before exiting the housing through the discharge air outlet.

2. The system of claim 1, further comprising a first particle filter adjacent the air inlet of the housing and a second particle filter adjacent the discharge outlet of the housing.

3. The system of claim 1, wherein the first UVC energy source is arranged within a first port.

4. The system of claim 3, wherein the second UVC energy source is arranged within a second port.

5. The system of claim 1, wherein the delay chamber forms a faraday cage operative to contain microwave radiation from the first and second magnetrons within the delay chamber.

6. The system of claim 1, further including a blower adjacent the discharge air outlet of the housing.

7. The system of claim 1, further including a pair of telescopic tubes coupled to the air inlet of the housing.

8. The system of claim 7, further including an air collector coupled to an open end of one of the pair of telescopic tubes.

9. The system of claim 1, further including a microwave shielding screen adjacent the inlet and outlet of the delay chamber.

10. The system of claim 1, wherein the first and second UVC energy sources each comprise a 265 nm UVC led source.

11. A system for processing air for the removal of pathogens, the system comprising:
a housing having an air inlet for receiving contaminated air to be processed and a discharge air outlet for discharging processed air;
a delay chamber having an inlet and an outlet, the delay chamber comprising RF transparent material forming a labyrinth of alternating passages, the delay chamber arranged within the housing between the air inlet and discharge air outlet;
a first magnetron adjacent the inlet of the delay chamber and a second magnetron adjacent the outlet of the delay chamber, the first and second magnetrons generating microwave radiation directed into the labyrinth of the delay chamber;
a first UVC energy source within a first port between the air inlet of the housing and the inlet of the delay chamber for exposing contaminated air to UVC energy before passing through the delay chamber;
a second UVC energy source within a second port between the outlet of the delay chamber and the discharge air outlet of the housing for exposing air exiting from the delay chamber to UVC energy before exiting the housing through the discharge air outlet;
a first particle filter adjacent the air inlet of the housing and a second particle filter adjacent the discharge outlet of the housing; and
a blower adjacent the discharge air outlet of the housing.

12. The system of claim 11, wherein the delay chamber forms a faraday cage operative to contain microwave radiation from the first and second magnetrons within the delay chamber.

13. The system of claim 11, further including a microwave shielding screen adjacent the inlet and outlet of the delay chamber.

14. A system for processing air for the removal of pathogens, the system comprising:
a housing having an air inlet for receiving contaminated air to be processed and a discharge air outlet for discharging processed air;
a delay chamber having an inlet and an outlet, the delay chamber comprising RF transparent material forming a labyrinth of alternating passages, the delay chamber arranged within the housing between the air inlet and discharge air outlet, wherein the delay chamber forms a faraday cage operative to contain microwave radiation within the delay chamber;
a first magnetron adjacent the inlet of the delay chamber and a second magnetron adjacent the outlet of the delay chamber, the first and second magnetrons generating microwave radiation directed into the labyrinth of the delay chamber;
a first UVC energy source within a first port between the air inlet of the housing and the inlet of the delay chamber for exposing contaminated air to UVC energy before passing through the delay chamber;
a second UVC energy source within a second port between the outlet of the delay chamber and the discharge air outlet of the housing for exposing air exiting from the delay chamber to UVC energy before exiting the housing through the discharge air outlet, wherein the first and second UVC energy sources each comprise a 265 nm UVC led source;
a first particle filter adjacent the air inlet of the housing and a second particle filter adjacent the discharge outlet of the housing, wherein at least one of the particle filters comprises a HEPA filter;
a microwave shielding screen adjacent the inlet and outlet of the delay chamber; and
a blower adjacent the discharge air outlet of the housing.

15. The system of claim 14, further including a pair of telescopic tubes coupled to the air inlet of the housing.

16. The system of claim 15, further including an air collector coupled to an open end of one of the pair of telescopic tubes.

* * * * *